United States Patent

Klemm et al.

(10) Patent No.: US 7,751,542 B2
(45) Date of Patent: Jul. 6, 2010

(54) FEEBLE RING TONES

(75) Inventors: Reinhard P. Klemm, Basking Ridge, NJ (US); Doree Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 1098 days.

(21) Appl. No.: 11/418,331

(22) Filed: May 4, 2006

(65) Prior Publication Data

US 2007/0274503 A1    Nov. 29, 2007

(51) Int. Cl.
  *H04M 3/42*    (2006.01)
  *H04L 12/66*   (2006.01)
  *H04L 12/16*   (2006.01)
  *H04Q 11/00*   (2006.01)

(52) U.S. Cl. .............. 379/201.07; 379/201.08; 379/202.01; 379/205.01; 370/259; 370/260; 370/261; 370/352

(58) Field of Classification Search ........... 379/201.07, 379/201.08, 202.01, 205.01; 370/354, 352, 370/259, 260, 261, 262
See application file for complete search history.

(56) References Cited

U.S. PATENT DOCUMENTS

| 6,141,328 | A  | * | 10/2000 | Nabkel et al. ............... 370/259 |
| 7,263,095 | B1 | * | 8/2007  | Sarkar ....................... 370/352 |
| 2006/0003814 | A1 |   | 1/2006  | Moody et al. |
| 2007/0237135 | A1 | * | 10/2007 | Trevallyn-Jones et al. ... 370/354 |
| 2008/0101347 | A1 | * | 5/2008  | Kauhanen et al. ........... 370/352 |

OTHER PUBLICATIONS

Tang, John C. et al., Montage: Providing Teleproximity for Distributed Groups, *Human Factors in Computing Systems*, p. 37-43 (1994).
Tang, John C. et al., Supporting Distributed Groups with a Montage of Lightweight Interactions, p. 23-34 (1994).

* cited by examiner

*Primary Examiner*—Thjuan K Addy
(74) *Attorney, Agent, or Firm*—Cohen Pontani Lieberman & Pavane LLP

(57) ABSTRACT

A system and method for permitting an initiator of a communication session request and a recipient of the communication session request to quickly negotiate the beginning of a communication session, such as a phone call, wherein the negotiation is performed based on the expressed current need and the current availability of the recipient.

17 Claims, 8 Drawing Sheets

FEEBLE RING TONES

BACKGROUND OF THE INVENTION

1. Field of the Invention

The present invention generally relates to the field of peer-to-peer and brokered communication services and, more particularly, to a system and method for permitting an initiator and a recipient to quickly negotiate the beginning of a communication session based on the initiator's expressed current need and the current availability of the recipient.

2. Description of the Related Art

When establishing traditional communication sessions, e.g. a traditional phone call, where the recipient of a phone call can use at most the phone number of the initiator as the basis for deciding whether to accept the phone call or not, there is no way for the recipient to judge the intent of the phone call, such as the urgency or the type of conversation the initiator wants to engage in, the alternative availabilities of the initiator if the recipient would like to talk to the initiator at a later time, or even the best mode of communication for the intended type of conversation. In the absence of all this information, the recipient can only decide whether to accept or decline to accept the call. If the user accepts the call, then the user can learn the session context as part of the phone call. If the recipient, after having accepted the call, learns that he or she would rather not continue the phone call, for reasons of etiquette, it may be difficult to immediately end the phone call. A rapid negotiation prior to call setup would save both the recipient and the initiator time and effort, and increase the productivity and convenience of both entities.

Existing product technologies permit users to associate specific phone numbers with different ring-tones to map incoming calls from known telephone numbers to different ring-tones. As a result, recipients of phone calls from known telephone numbers are permitted to determine the identification of a caller based solely on the sound of the ring-tone. However, associating ring-tones with phone numbers neither permits the recipient of a phone call to gauge the importance and urgency of an incoming phone call nor does it permit the recipient of a phone call to negotiate a later, more appropriate time and/or method to communicate with the caller. That is, the phone call must be either immediately accepted or rejected.

Montage is a system developed by Sun Microsystems that comprises a human session initiation protocol, i.e. it permits a person to visually and remotely check whether another person is present at a particular location, such as an office, and whether that person is more than likely available for communication via so-called "glances" at a person being viewed over a web enabled camera. Montage permits the initiating party to then request from the other person the setup of a communication session (either text, voice or video-based), and the recipient of the request can indicate, in various ways, whether he is available for communication with the initiator of the communication session. Montage moves the communication setup protocol between an initiator and a recipient to a virtual space. The setup protocol is entirely based on human interaction, but it is not an automated process. As a result, both the initiator of the communication and the recipient thereof must be humans, which requires a considerable level of manual effort on the part of the initiator and the recipient. More importantly, the initiator and the recipient cannot be software-based user agents.

The sender of an email is permitted to specify a priority level that is displayed to the person receiving the email having the specified priority level. Setting priorities for emails, however, does not translate into a visual, tactile or acoustic signal that the email recipient can perceive and interpret without actually looking at the email header. As a result, the email recipient is already forced to at least partially consider the email before being able to determine its importance and urgency. In addition, the complete email must be sent to the recipient before the recipient can interpret the priority of the email. Clearly, the email priority level and willingness of the intended recipient to accept it are not negotiated before the email is sent to the recipient.

In traditional telephony, the recipient of a phone call hears a ring-tone or a visual/tactile equivalent thereof, and can then decide whether to accept the call based on the ring-tone itself and possibly information about the initiator's identity. An intelligent ring-tone service modulates the ring-tone or the visual/tactile equivalent to allow the recipient to infer the urgency and importance of the call, as well as possibly infer other information. Based on this information, the recipient can make a better decision than would be possible with plain ring-tones as to how available he is to accept the communication request. However, this conventional technique does not permit the recipient to enter into a negotiation with the initiator prior to establishment of the communication session. For example, a phone call recipient must pick up the phone to tell the caller that she is currently unavailable for the type of communication that the caller has in mind and that the caller may want to call again at a later time. This is time-consuming because human social contracts often prohibit expedited negotiations and because technical problems, such as cell phone reception, might slow down such negotiations. A traditional negotiation may be particularly unwelcome to the recipient if the initiator only intends to engage in a social chat or wants to ask an incidental question at a time that the recipient is currently occupied with an important task.

Celine Pering, "Taming of the Ring: Context Specific Social Communication Devices" *Short Talk: Communication Media, CHI: Changing the World, Changing Ourselves*, CHI 2002, Minneapolis, Minn., USA discloses an interactive system and method for discretely handling phone communications in delicate situations. As disclosed therein caller-ID is used to provide enough information about the identity of the caller for the receiver to decide whether to answer the call. However, caller-ID does not provide a clear way to determine whether the caller wishes to engage in meaningless banter with the recipient or whether the caller has a more urgent issue that the recipient may wish to address.

In view of the foregoing, there is a need for a system and method for permitting an initiator and a recipient to quickly negotiate the beginning of a communication session, such as a phone call, based on the expressed current need of an initiator and the current availability of a recipient to participate in the communication session.

SUMMARY OF THE INVENTION

The present invention is directed to a system and method for permitting an initiator and a recipient to quickly negotiate the beginning of a synchronous communication session, such as a phone call, based on the expressed current need of an initiator and the current availability of a recipient to participate in the communication session. In particular, present invention supports a synchronous communication session that is dedicated to incidental or casual communication. The invention provides a protocol for establishing a synchronous communication session between an initiator and the recipient to allow them to quickly negotiate the beginning of a synchronous communication session, such as a phone call or video call. The establishment or termination of the communication session itself is not part of the claimed protocol. As part of the protocol, the initiator conveys the importance, urgency, topic ("subject line"), and possibly other pertinent parameters of the initiator's request to the recipient.

The initiator of a request for communication is permitted to initiate a request for a lower priority communication with a recipient. The request can include a subject line and parameters indicating the importance of the request, where the request subject line would be an indicator, such as "I am bored—just want to chat", and the urgency and importance parameters would be set to low. In accordance with the contemplated embodiments of the present invention, some parameters, such as the subject line of a message, have an infinite range of possible values that can be selected from a finite, default set that reflects frequently used well known values.

In response to the communication request from the initiator, an agent, e.g. a mobile phone, of the recipient would render a low-volume, i.e., feeble, intermittent ring-tone that indicates a low priority communication request. If the recipient is present and near his agent, then the recipient could infer from the ring-tone and the parameters displayed by his agent that the request is low priority and can evaluate the request against his current availability to engage in the communication, i.e. phone call.

If the recipient is unavailable to engage in the low priority communication session, then he can select a reply from the list of possible replies presented by his agent. The initiator would then receive the reply and act accordingly. If the recipient is currently available for the communication session, the initiator can instruct his agent to establish the communication session, such as by immediately calling the recipient. Here, the recipient can either accept or reject the request to establish communication based on the communication parameters or engage in a negotiation with the initiator based on the parameters. The negotiation can include requesting more information about the communication and/or can involve changing the communication request. Eventually, the negotiation can lead to acceptance or rejection of the original communication request or a modification of the original request. In other words, the present invention provides a protocol for establishing inter-communication between different participants. Naturally, it is possible for the present invention to be used to convey a highly urgent request for communication setup. Realizing that the request is urgent, the recipient could then decide to immediately become available for that communication session even if the recipient is currently occupied with an important task.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE PRESENTLY PREFERRED EMBODIMENTS

A system and method are disclosed for permitting an initiator of a communication session request and a recipient of the communication session request to quickly negotiate the beginning of a synchronous communication session based on the initiator's expressed current need of the initiator and the current availability of the recipient for such a communication session. The present invention provides a system and method for permitting the initiator of a synchronous, remote communication between people, for example, a phone call, to convey parameters of the communication, such as the purpose, importance or desired time for communication, to the recipient of the communication session request prior to the commencement of the communication session. Here, the recipient can either accept or reject the request to establish communication based on the communication parameters or engage in a negotiation with the initiator based on the parameters. The negotiation can include requesting more information about the communication and/or can involve changing the communication request. Eventually, the negotiation can lead to acceptance or rejection of the original communication request or a modification of the original request. In other words, the present invention provides a protocol for establishing inter-communication between different participants.

Figure 1:
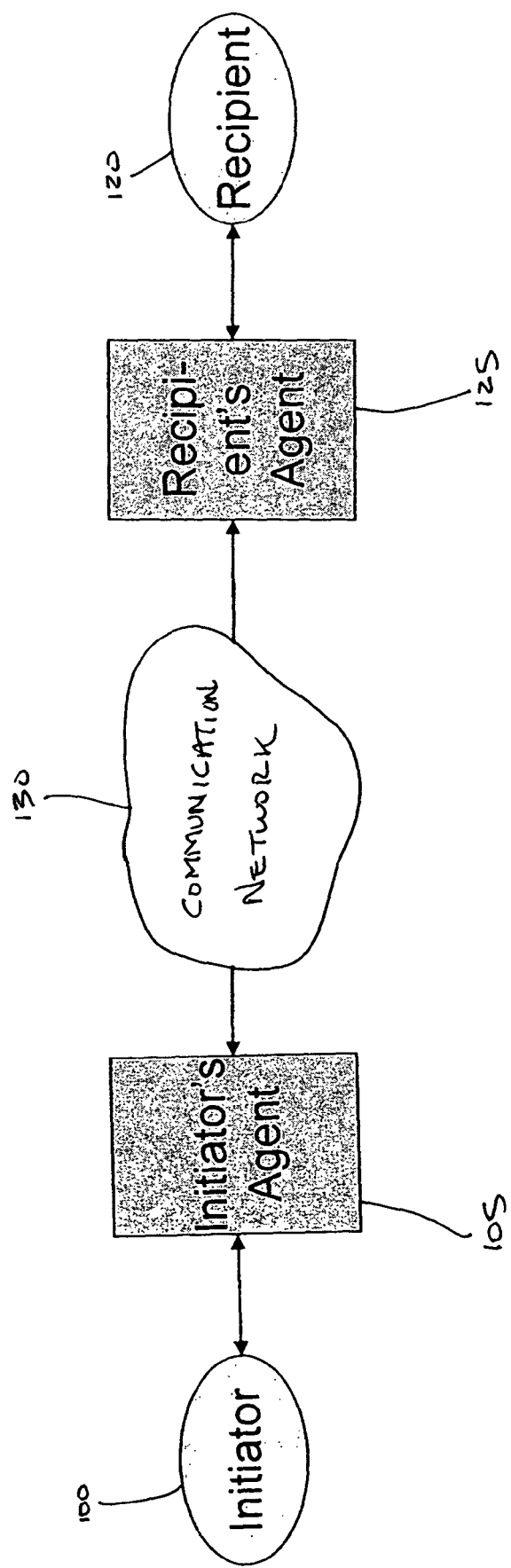
FIG. 1 is a schematic block diagram illustrating a configuration of an initiator and a recipient along with their respective agents in accordance with invention.

FIG. 1 is a schematic block diagram illustrating a configuration of an initiator and recipient along with their respective agents in accordance with invention. Both the initiator 100 and recipient 120 of a communication request each require a serving agent (105, 125). With respect to the initiator 100, such a serving agent 105 permits the entry and expression of specific communication parameters relating to the request for communication with the recipient 120. With respect to the recipient 120, the agent 125 translates these communication parameters into various textual, tactile, audible, or visible signals that permit a human recipient to easily interpret the parameters. Preferable, the agents (105, 125) of the initiator 100 and recipient 120 support the negotiation process that might ensue if the recipient 120 wishes to negotiate to establish communication with the initiator. In accordance with the invention, the agent of the recipient 125 may also automatically reject, accept, and negotiate communication requests based on predefined user settings.

In a preferred embodiment of the invention, the agent of the initiator 105 comprises a Web portal (not shown) that permits the initiator 100 to launch a communication application, which in turn forwards the communication request to the agent of the recipient 125. In certain embodiments, the functions associated with a communication application serving as an intermediary between the initiator 100 and the recipient 120 is not utilized. It is to be understood that a Web portal is not the only way to provide service to the initiator and it is not the intention of the present invention to be limited to the presently disclosed embodiment.

In accordance with the contemplated embodiments of the present invention, the direct initiator of a communication is always an application that is either triggered by another application or by a human. Alternatively, a peer-to-peer environment is utilized where the initiator and the recipient are humans and their serving agents communicate directly without implementing the functionality of an intermediary communication application, as shown in FIG. 1.

Figure 2:
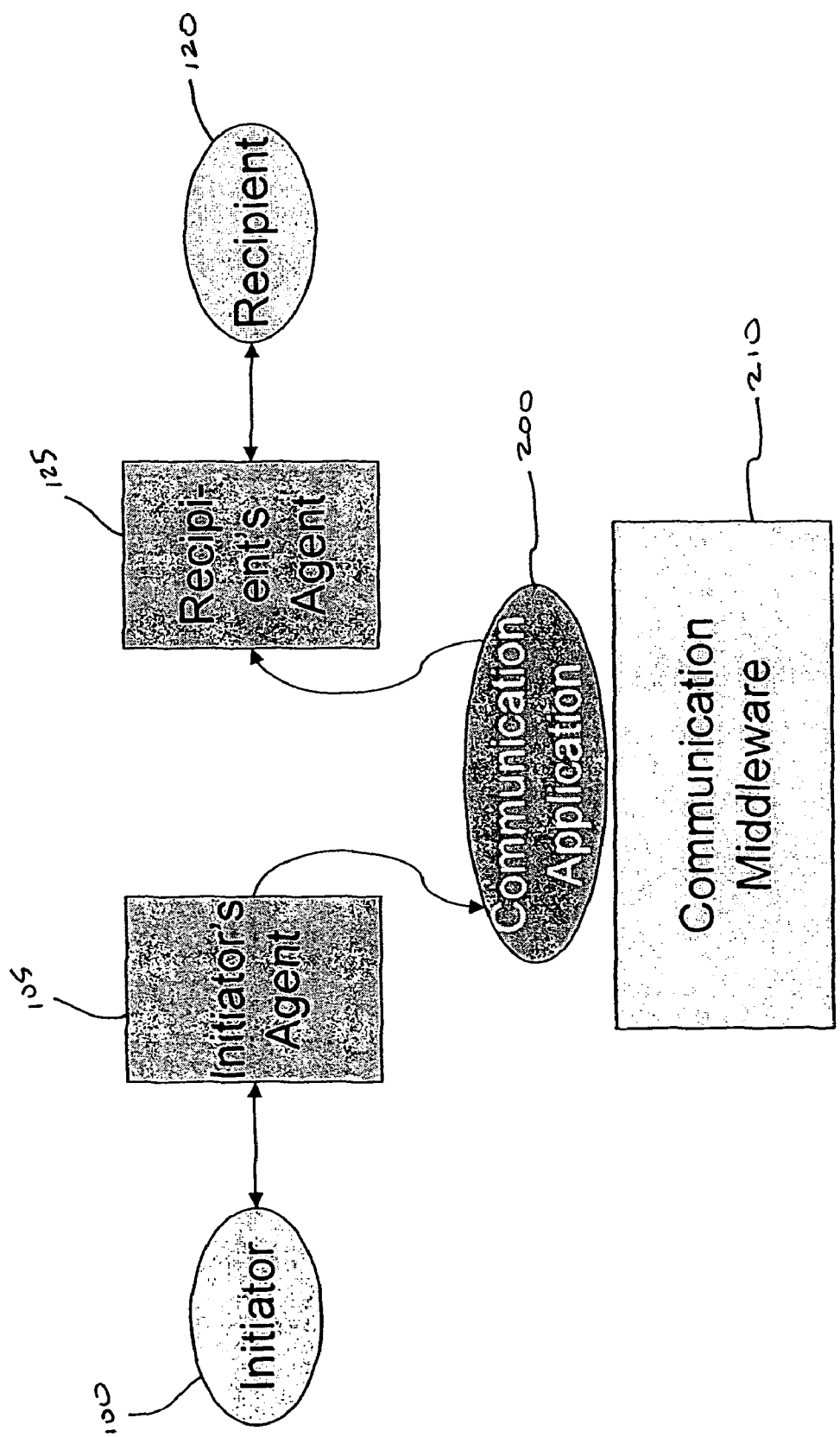
FIG. 2 is a schematic block diagram illustrating a configuration of an initiator and recipient along with their respective agents in accordance with an alternative embodiment of the invention.

FIG. 2 is a schematic block diagram illustrating a configuration of an initiator and recipient along with their respective agents in accordance with an alternative embodiment of the invention. In the contemplated embodiment, requests for third-party communications between humans are generated. For example, a communication application 200 can request the setup of a phone call between two people. In one embodiment of the contemplated invention, a two-phase negotiation is performed to initiate the communication between the parties. During the first phase, a check is performed to determine whether a recipient 120 is presently available and interruptible for an invitation to engage in the communication session. If the recipient is available to receive the invitation, then a second phase follows, during which the recipient 120 receives a Synchronized MultiMedia Integration Language (SMIL) interaction or dialog that permits the recipient 120 to negotiate the acceptance, rejection or modification of specific aspects of the communication invitation. In the alternative embodiment, the first negotiation phase is bypassed, where the second phase is immediately entered such that the recipient can negotiate to accept, reject or modify specific aspects of the communication invitation. FIG. 1 shows a configuration wherein the functions associated with the communication application are not implemented and direct negotiation for the communication session occurs between the agents 105, 125 over the communication network 130.

SMIL is a computer language similar to HTML that is used to describe audiovisual presentations. SMIL can also be used to create Internet or Intranet presentations, as well as slide-show presentations. SMIL is analogous to PowerPoint®, where SMIL operates in an Internet computing environment. SMIL presentations can simultaneously display multiple file types, such as text, video and audio, and can also display files from multiple web servers. SMIL presentations can also contain links to other SMIL presentations, and may also contain control buttons, such as "stop", "start" or "next". In addition, SMIL includes functions for defining sequences and the duration of elements within a presentation, and for defining the position and visibility of elements.

Figure 3:
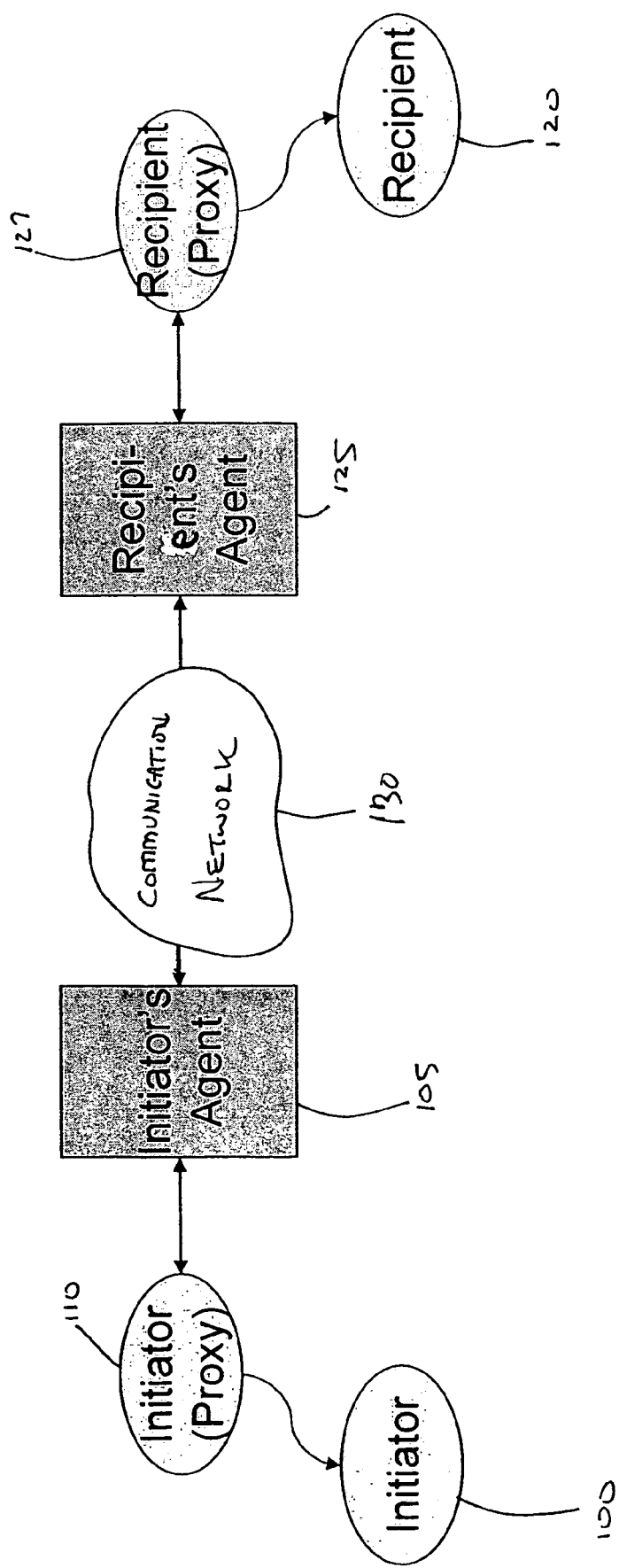
FIG. 3 is a schematic block diagram illustrating the interrelationship of proxies associated with an initiator and recipient in accordance with the invention.

FIG. 3 is a schematic block diagram illustrating the interrelationship of proxies associated with an initiator and recipient in accordance with the invention. Here, an entity, i.e. an initiator 100 of a request for communication, seeks to negotiate a synchronous remote communication session with another entity, i.e. a recipient 120, where a proxy initiator 110 and a proxy recipient 127 serve as the proxies for other entities. For example, the proxy initiator 110 may wish to establish a communication session on behalf of another entity 100 and the proxy recipient 127 may negotiate on behalf of another entity 120. Examples of a communication session are a phone call, instant message exchange (IM) or a videoconference. In other contemplated embodiments, communication is initiated by more than one initiator and/or with more than one recipient. In accordance with the contemplated embodiments, the initiator 100 and the recipient 120 can be either human or software entities.

In the contemplated embodiments of the present invention, the initiator 100 and the recipient 120 are paired with a serving agent, i.e. a serving agent for the initiator 100 and a serving agent for the recipient 120, respectively. If the initiator or recipient is a software entity, then its serving agent may be comprised of the initiator or recipient. However, in the contemplated embodiments, it is to be understood that there is an initiator or recipient and a separate agent for each entity. In the preferred embodiment, the agent is software based.

The initiator 100 first conveys the context of the requested communication session to the recipient 120, instead of immediately establishing a communication session at the request of the initiator. The initiator 100 and the recipient 120, via their respective agents 105, 125, negotiate the specifics associated with establishing the communication session. The context of the requested communication session may include but is not limited to the name of the initiator, a session topic, session importance, communication category (e.g., "casual chat", "urgent matter", etc.), supporting multimedia documentation, the list of initiators and recipients, or the expected outcome of the communication session. The specifics associated with establishing the communication may include but are not limited to whether the session will occur, the start time, the mode of communication and the duration thereof. The purpose of the negotiation is to permit the recipient 125 to quickly determine whether, how and when he may want to establish a communication session with a particular initiator, based on the indicated context.

The initiator 100 conveys the session context to his agent 105 to request the establishment of a communication session. The agent of the initiator 105 then transmits the context of the request to the agent of the recipient 125, either directly through the communication network 130 (FIG. 1) or through mediation that is performed by the communication application 200 (FIG. 2). In an embodiment of the invention, the initiator 100 is unaware of the identity of the recipient 120 and therefore, includes a description of the desired kind of recipient in the session context. Here, the communication application 200 shown in FIG. 2 can route the communication request to the appropriate recipients based on the session context that is provided by the initiator 100.

Once the agent of the recipient 125 has received the communication request, a negotiation of the specifics associated with establishing the requested communication session with the agent of the initiator 105 is performed. Here, it is possible to execute a portion of the negotiation without the active or immediate involvement of the recipient. For example, the agent of the recipient 105 may be able to monitor the activities and context of the recipient 120 using known techniques associated with context-aware computing and context-aware communications, and infer that the recipient 120 is currently unable to accept any or the specific requested communication session. The recipient 120 may also configure his agent 125 to reject or accept all requests or only specific requests. It is also possible for the agent of the recipient 125 to automatically decline the communication request or negotiate an attempt to establish communication with the recipient 120 at a later point in time.

In accordance with the contemplated embodiments, if the agent of the recipient 125 is unable to ascertain the availability of the recipient 120 for the requested communication session, then an attempt is performed to more actively involve the recipient 120 in the negotiation. For example, the agent of the recipient 125 may map the context of the requested communications session to audible, visible, tactile, and textual signals so that a human recipient can interpret the urgency, importance and type of session, quickly and conveniently. In the preferred embodiments, the agent of the recipient 125 would emit a ring-tone having an amplitude, frequency and duration that are derived from the session context. In addition, the agent of the recipient 125 would display the session context for visual perception by the recipient. In accordance with the contemplated embodiment, if the recipient 125 were a software entity, then the agent of the recipient 125 would forward the session context to the recipient 120. Here, the recipient 120 may now decide to immediately accept or decline the communication request or negotiate a modification of the request with the initiator 100.

In accordance with the contemplated embodiments, it is possible for the session context to include a scripted dialog that the agent of the recipient agent can render to negotiate a change in the communication request. Here, the scripted dialog permits the recipient to interactively navigate a decision tree having a specific outcome. Alternatively, a set of default dialogs is included in the agent of the recipient 120 and the session context contains a designation of the dialog to render based on the default dialogs. However, if the set of default dialogs contains exactly one dialog, then it is not necessary for the designation to be included as part of the session context.

The outcome of the interaction between the recipient 120 and the dialog is based on a set of possible modifications to the original request to establish communication. Here, the agent of the recipient 125 sends this outcome set back to the agent of the initiator, which may accept one of the modification requests or reject them all. However, if the modification request is denied, then the agent of the initiator 105 informs the agent of the recipient 125 that all modification requests have been denied. Here, the agent of the recipient 125 may re-involve the recipient 120 in the same dialog to permit the recipient to change the modification suggestions, and the negotiation process is restarted.

In contemplated embodiments where the communication application 200 shown in FIG. 2 performs the mediation between the agent of the initiator 105 and the agent of the recipient 125, the portion of the negotiation that does not actively engage a human recipient may be performed in the communication application 200. Here, the agent of the recipient 125 periodically, or upon request, forwards information related to the activities and context of the recipient 125 to the communication application.

The communication middleware 210 shown in FIG. 2 is context-aware middleware, such as Hermes. An example of middleware specifically for context-aware communication applications is the Hermes platform developed at Avaya Labs Research and is described in Klemm et al., "Hermes: A System for Orchestration of Shared Communication Spaces", *Technical Report ALR*-2004-019, April 2004, the content of which is incorporated herein in its entirety. Context-aware computation is discussed and middleware for context gathering and dissemination is described in Lei et al., "The Design and Applications of a Context Service", *ACM SIGMOBILE Mobile Computing and Communications Review* 4, Oct. 6, 2002, pgs. 45-55, the content of which is incorporated herein in its entirety. In the contemplated embodiments of the invention, the context-aware middleware 210 provides a Web Services interface that permits agents 105, 125 to report presence and user activity data, as well as client-side capabilities. In addition, the context-aware middleware 210 relays dialogs originating from communications application 200.

The more communication endpoints the communication application 200 can use to retrieve user context information and to render dialogs on, the more the application can refine, optimize, and accelerate its communications decisions. In the present contemplated embodiments, Web browsers comprise an exemplary endpoint for collecting presence and activity information and rendering dialogs. Web browsers comprise an optimal candidate for gathering user context information, i.e. presence and activity information, and for rendering multimedia dialogs. Web browsers are universally deployed across user computers and devices, and are versatile pieces of software. As a result, the Web has become the client software of choice for many user activities, such as for accessing collaboration tools, information retrieval or for downloading multimedia content.

As disclosed in the publication Knorr, E., "The New Enterprise Portal", *InfoWorld*, January 2004, many enterprises have deployed Web-based enterprise portals that provide a unified access point to a wide spectrum of applications in the enterprise. Web browsers have gained particular importance as client software in such enterprises. Many enterprise users spend a considerable amount of time interacting with Web browsers. As a result, the collection of context data while a user interacts with Web browsers is advantageous.

It is known that Web browsers support the uploading of information to servers, as well as the retrieval of multimedia content. As a result, an infrastructure is provided for transmitting presence and other user context data to context-aware applications, retrieving dialogs. Consequently, a user is permitted to interact with the retrieved dialogs, and user feedback is returned to context-aware applications. Hence, browsers can enable a seamless user experience for accessing Web content and interacting with context-aware applications through dialogs. It is to be understood that a Web browser is not the only way to obtain context information and to render dialogs, and it not the intention that the present invention be so limited.

Figure 4:
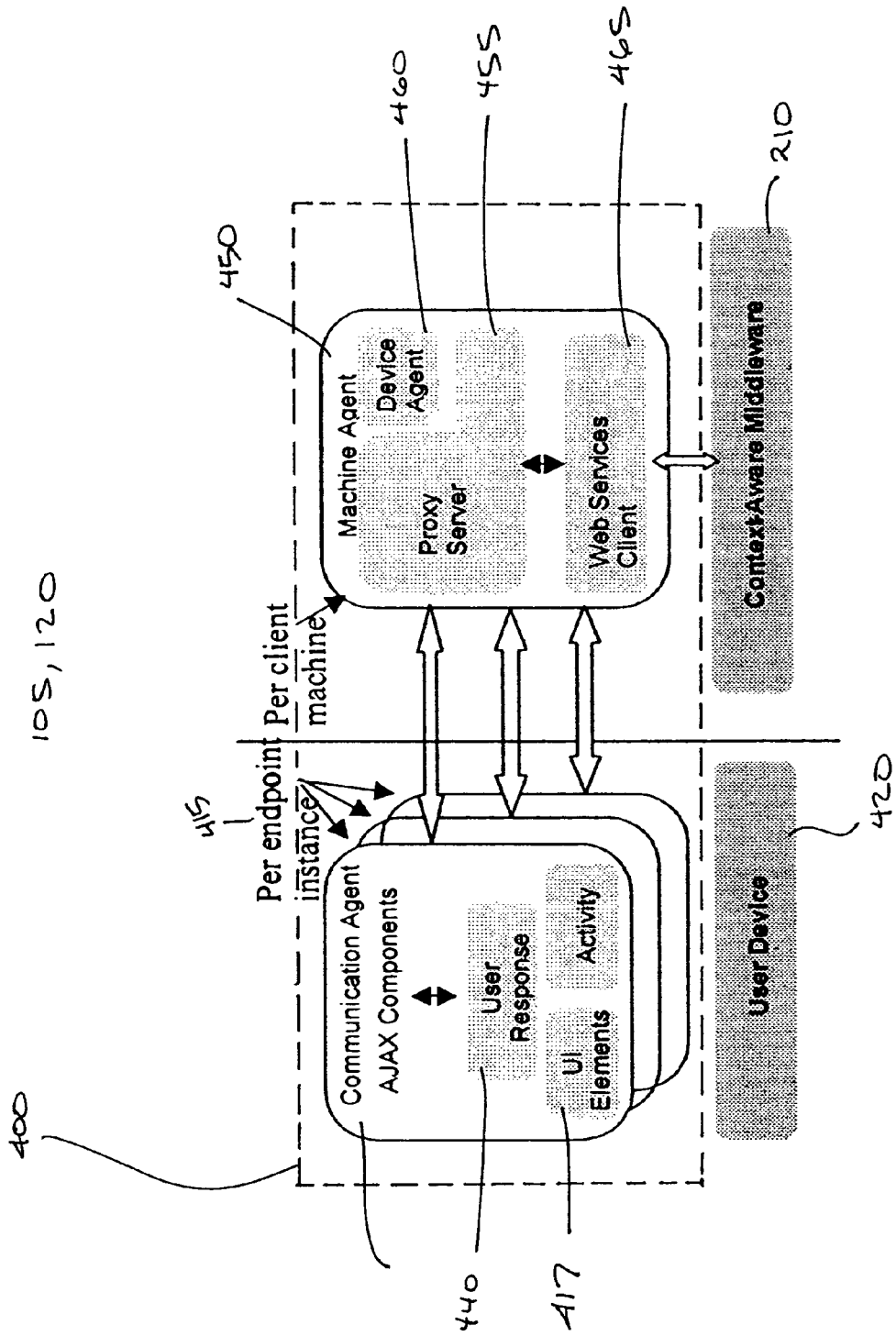
FIG. 4 is a schematic block diagram illustrating the architecture of the agent of FIGS. 1, 2 and 3.

FIG. 4 is a schematic block diagram illustrating the architecture of the agent of FIGS. 1, 2 and 3. The agent 105, 120 is comprised of two major components, i.e., a communication agent 400 and a machine agent 450. In accordance with the exemplary embodiment where a Web browser is used, the communication agent 400 is integrated with the Web browser, where each per endpoint instance 415 is a specific browser window that resides on the desktop of a computing device. However, the machine agent 450 resides outside the browser and mediates between the communication agent 450 and the context-aware middleware 210. The communication agent comprises browser user interface (UI) components and the Asynchronous Java and XML (AJAX) components as disclosed in Garrett, J. J., "Ajax: A New Approach to Web Applications", *Adaptive Path Essays*, February 2005. In accordance with the contemplated embodiments, it is possible for more than one communication agent 400 to be active. However, the number of active communication agents 400 depends on how many browser instances are being simultaneously executed on a client user device 420. The machine agent 450 comprises a proxy server 455, a device agent 460 and a Web Services client interface 465 for communication with the context-aware middleware 210.

A Web browser session starts when an instance of the browser begins executing and ends when that instance terminates. Within a browser session, each user interface activity, such as browser button clicks, hyperlink clicks, changing browser window size, entering text into a document or clicking buttons in a document, and rendering multimedia content—each of which are obtained from the browser—counts as a user presence indication and is captured and stored as user activity information.

The communication application 200 of the invention categorizes the types of presence and activity data, and subsequently determines the present availability and interruptability of the recipient based on the detailed presence and activity information. It will be appreciated that the interruptability of the recipient must be assessed vis-à-vis a specific type of application and a specific piece of communication or interaction within the application.

In accordance with the preferred embodiment, a Web browser permits the implementation of context data collection and dialog rendering to be achieved with relative ease. Here, a pre-existing browser having a large install base, such as the Mozilla® Firefox® Web browser, is used to customize the browser for use with the system and method of the present invention. Here, extensions 425 (FIG. 6) may be used to easily add new functionality to the browser in a modular and platform independent manner.

The configuration of the extension 425 is performed based the occurrence of events, where the user interface is specified using the XML User Interface Language (XUL), while the event handlers, which define the browser behavior, are implemented using JavaScript. It is a goal of the present invention to provide user transparency, i.e. the user (i.e. the initiator 100 or recipient 120) should be unaware of the presence and activity monitoring as it occurs, as well as the collection of information when he is using the browser interface. Beginning with the start of each browser session, every user interface activity triggers an event, and a corresponding JavaScript handler inside the Firefox® extension is initiated that logs the event. The event handler execution is not noticeable to the user, i.e., the initiator 100 or recipient 120.

In accordance with a frequency that is set by a user, the Firefox® extension periodically bundles the logged events into a presence and activity information packet and pushes it to the machine agent 450. Naturally, it will be appreciated that the accuracy of the presence and activity that is evaluated by the communication application 200 becomes greater as the frequency at which the presence and activity information is updated is increased. On the other hand, a higher update frequency also increases the computing load on the client that hosts the machine agent 450. In addition, a higher update frequency increases the bandwidth requirements between the agent 105, 120 and the communication middleware 210, i.e., the context-aware middleware.

The UI elements 417 shown in FIG. 4 include controls (not shown) for the user to turn the presence and activity collection feature off to allow the user to protect his privacy. The Firefox® extension when implemented in the contemplated embodiments of the present invention provides a toolbar (not shown) in every browser window that contains buttons to activate or deactivate context gathering and dissemination. If the user permits context data to propagate to the communication middleware 210, it becomes the responsibility of the middleware 210 to protect the privacy of the user. For example, the Hermes middleware includes brokered presence, where decisions based on presence and activities are delegated to the Hermes application by the context-aware communication applications 200. Decision delegation ensures that context-aware communication applications 200 do not directly process presence and activity information and thus, cannot accidentally or intentionally disclose such data to third parties.

In the contemplated embodiments, the context propagation functionality for a given client is delegated to HTTP proxy server 455 of the dedicated machine agent 450 shown in FIG. 2. The server 455 functions as a broker for all sessions between that endpoint (i.e., the client) and the communication middleware 210. There are specific advantages associated with separating the broker from the presence and activity collection portions of the system. For example, a modular system is achieved because collection and propagation functions are separated. As a result, extension design is simplified. The broker also provides state management for all active sessions on a single client. Finally, scalability is achieved because the broker provides state management functionality, which would otherwise be required to be implemented on the middleware side of the system. Scalability of the present invention is maintainable as the number of clients and communication endpoints increases.

Figure 5:
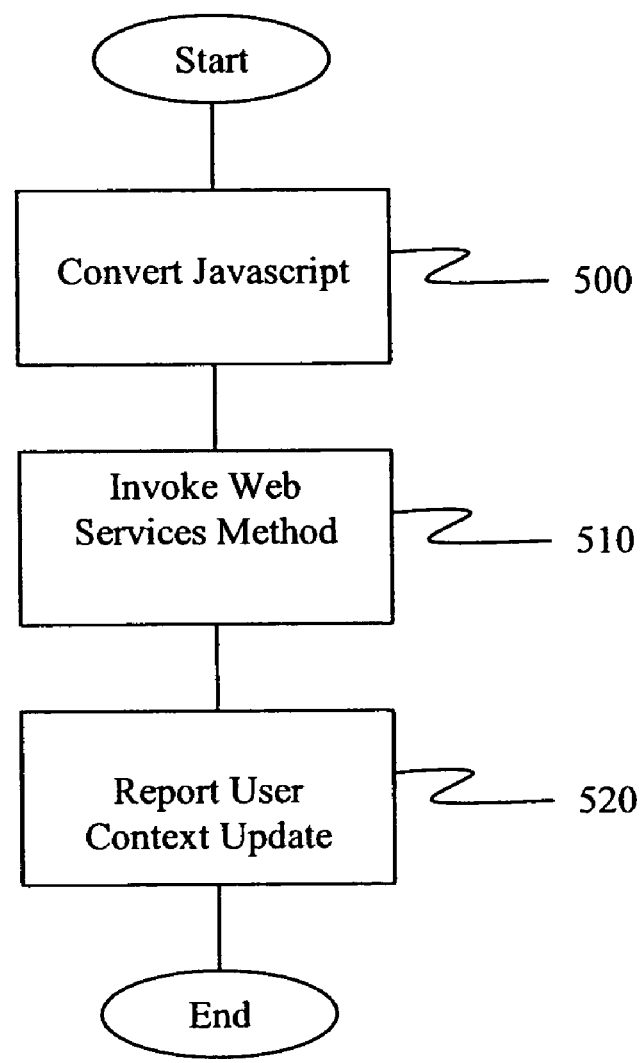
FIG. 5 is a flow chart illustrating the steps associated with propagating presence and activity information from an agent to the context-aware middleware in accordance with the disclosed embodiments of the present invention.

FIG. 5 is a flow chart illustrating the steps associated with propagating presence and activity information from the communication agent 400 to the communication middleware 210 in accordance with the disclosed embodiments of the present invention. The communication agent 400 converts JavaScript event handler function calls into asynchronous HTTP requests for the proxy server 455, as indicated in step 500. Next, the proxy server 455 invokes a Web Services (WS) method in the communication middleware 210 to obtain a session ID if the server receives a Web browser startup event notification from the communication agent 400, as indicated in step 510. The session ID identifies a particular browser instance as a context data source and permits the agent 105, 120 to associate context data sources with presence and activity events when communicating with the communication middleware 210. The session ID is also used when the machine agent 450 polls the communication middleware 210 for pending dialogs, as discussed subsequently. Finally, the proxy server 455 invokes a WS method in the communication middleware 210 through the WS client interface 465 and reports the latest user context update from the communication agent 400 to the communication middleware 210, as indicated in step 520.

Figure 6:
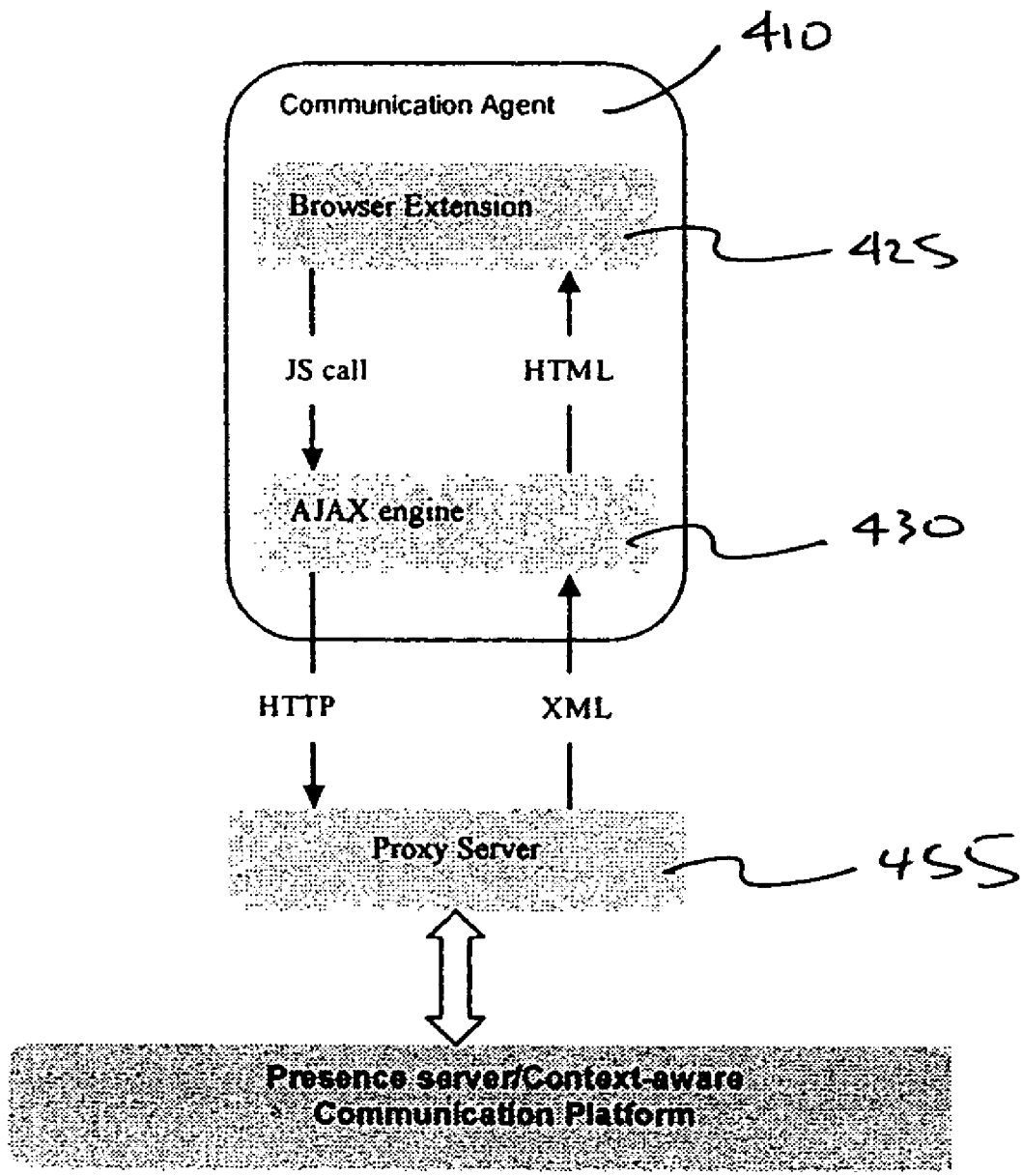
FIG. 6 is a schematic block diagram illustrating the proxy server communication of FIG. 2.

In accordance with the disclosed embodiments of the present invention, the AJAX protocol is used for the interaction between the Web browser and the broker, as shown in FIG. 6. The asynchrony provided by AJAX ensures complete user transparency with respect to the collection of presence and activity information. The interaction between the communication agent 400 and machine agent 450 (FIG. 4) and the middleware 200 is two-way, respectively, i.e. while the JavaScript event handlers call asynchronous HTTP requests, the communication middleware 210 sends SMIL dialogs to the communication agent via the proxy server 455.

A timeout event triggers the periodic presence and activity propagation mechanism in the browser extension 425, illustrated by the JavaScript (JS) call in FIG. 6. AJAX engine 430 uses AJAX protocol routines to convert the JS call into an HTTP request for transmittal to the machine agent 450. Once the AJAX routines have created the server request for the proxy server 455, control is returned to an extension event loop to handle further events in the browser.

Returning to FIG. 4, the use of the machine agent 450 as a broker to manage all sessions on an endpoint (i.e. at a user device) permits the machine agent 450 to gather client platform/hardware capabilities and propagate this information to the communication middleware 210, because the machine agent 455 resides outside of the Web browser. For example, if a client comprises a laptop computer in use by a recipient 100, properties such as keyboard support, battery strength, wireless signal strength, connection bandwidth, etc. can used by the communication middleware 210 to determine the mode of communication to be used for specific communication data that originate from the communication application 200.

The device agent 460 of the machine agent 450 implements the functionality associated with gathering client platform/hardware capabilities via an operating system-specific module that first gathers static client-side capabilities and, throughout its execution, periodically collects and propagates dynamic client information. The device agent 460 reports static client-side capabilities to the communication middleware 210 once, upon startup of the agents 105, 120 and periodically updates the communication middleware 210 with dynamic client-side parameters. In certain embodiments of the present invention, the device agent 460 is implemented in a Windows XP environment. However, it is to be noted that the device agent 460 can be easily modified to function in other operating systems. The client-side capabilities and parameters sent to the communication middleware 210 include the type of machine, i.e., laptop, desktop, PDA or mobile phone, processor information, network interface type, type of keyboard and mouse if any, and remaining battery strength. The device agent 460 is implemented as part of the machine agent 450 rather than the communication agent 400. As a result, the device agent 460 can operate independently of any browser sessions and thus, send client information directly to the communication middleware 210.

Preferably, SMIL is used in the present invention because it supports interactions with users and rich multimedia content. In particular, SMIL supports audio and video clips in addition to textual data and documents. SMIL also can be extended to the notion of dialogs as discussed subsequently in more detail. SMIL is the preferred dialog technology because (a) it is flexible in that it can be easily used for a wide number of context-aware applications; (b) designers of context-aware applications may use standardized tools to create SMIL dialogs, and (c) SMIL can be used as a general way to define structured dialogs irrespective of the mode of communication at the endpoint.

Figure 7:
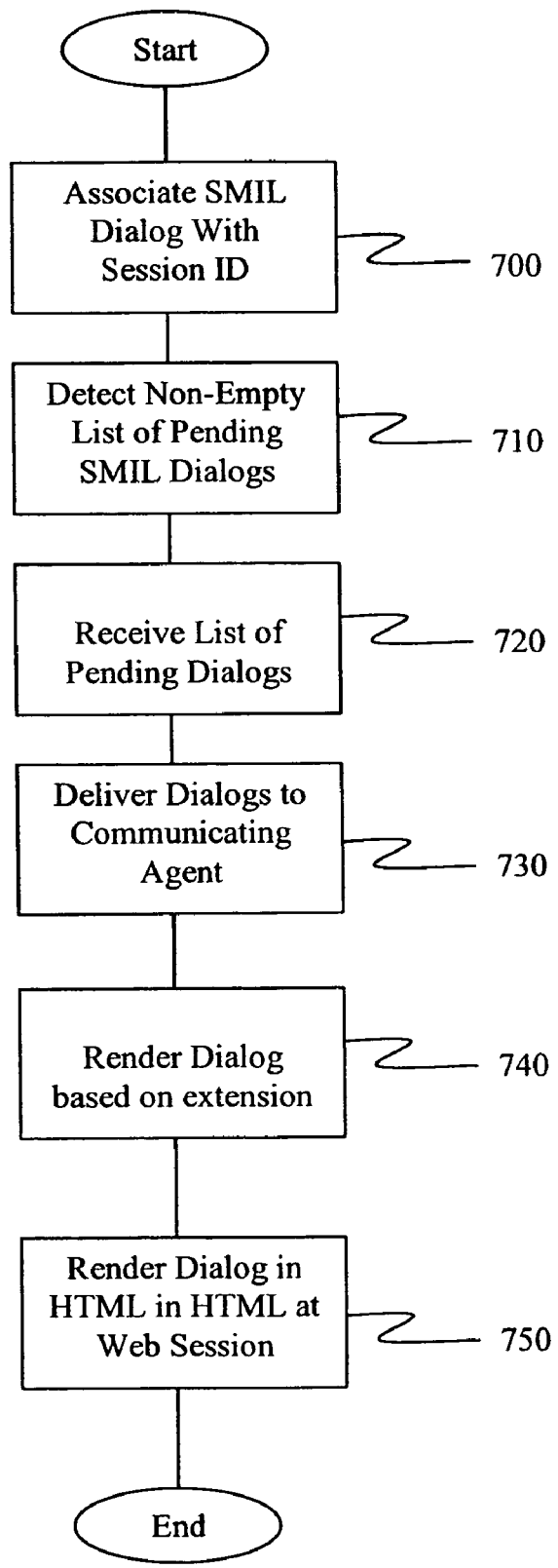
FIG. 7 is a flow chart illustrating the steps associated with inserting a dialog, originating at a context-aware communication application, into a Web browser session in accordance with the disclosed embodiments of the invention.

FIG. 7 is a flow chart illustrating the exemplary steps associated with inserting a SMIL dialog, originating at a context-aware communication application, into a Web browser session in accordance with the disclosed embodiments of the invention. The communication application 200 associates the dialog with the session ID of the target Web browser session, as indicated in step 700. The machine agent 450 detects a non-empty list of pending SMIL dialogs in the communication middleware 210 for an active session, as indicated in step 710. Here, the machine agent 450 performs a call to retrieve the appropriate Web session (WS) method stored in the communication middleware 210 and uses the ID of the active WS as a parameter for the WS method stored in the communication middleware 210.

Next, the machine agent 450 receives the list of pending SMIL dialogs for a specific user for the active Web browser session from the communication middleware 210, as indicated in step 720. The machine agent 450 delivers the SMIL dialogs to the communication agent 400, as indicated in step 730. In the preferred embodiment, the SMIL dialogs are delivered one dialog at a time.

Next, the communication agent 400 renders the SMIL dialog in accordance with the Firefox® extension, as indicated in step 740. If more than one SMIL dialog is pending for the specific user and the given Web session, the SMIL dialog having the highest priority, which is assigned by an originating context-aware application, is chosen by the machine agent 450 for subsequent delivery to the communication agent 400.

Next, the machine agent 450 sends the SMIL dialog to the communication agent of the respective Web session, which renders it as an HTML document, as indicated in step 750. In certain embodiments, the document includes multimedia content. From the perspective of a user or recipient 120, a pop-up browser window that displays the SMIL content can indicate the arrival of a SMIL dialog. In certain embodiments, a single interaction between a recipient 120 and a communication application 200 comprises at least one SMIL dialog, where the next SMIL dialog transmitted to the recipient 120 or the initiator 105 may depend on the response of the recipient 440 (see FIG. 4) to an earlier SMIL dialog. In other embodiments, the interaction between the initiator and the recipient can be displayed as a graph having SMIL dialogs as its nodes and edges as responses to SMIL dialogs. Here, the state of a particular interaction graph is maintained at the machine agent 450, where the state is the last SMIL dialog that was transmitted. Interactions between an initiator and a recipient are completed when no additional SMIL dialogs remain in the interaction graph.

In the preferred embodiment, SMIL dialogs are rendered as HTML documents. As a result, responses from an initiator 105 or recipient 120 are collected by the Web browser and sent back to the machine agent 450 as an HTTP request. Furthermore, the machine agent 450 may use this HTTP request to determine which SMIL dialog in the current interaction to send next, or may forward the HTTP request to the communication middleware 210 for further processing.

When communication application 200 prompts the communication middleware 210 to deliver a SMIL dialog to a user, the middleware based on the Hermes middleware sets the presence status of the SMIL dialog to "pending". When the agent 105, 125 performs a poll of the communication middleware 210 to determine whether there are pending dialogs for a respective initiator or recipient and receives a list of one or more SMIL dialogs, the communication middleware 200 knows that the agent 105, 125 has received these dialogs and assigns these dialogs a presence status of "consuming". At this point in time, either agent 105, 125 is rendering the SMIL dialog to the initiator or recipient. Once the initiator or recipient has responded to the dialog via their respective agent, the agent returns their responses to the communication middleware 210 and the middleware can then adjust the presence status of the dialog to "completed".

It is contemplated that a class of dialogs that are not immediately rendered upon receipt by an agent can be implemented and therefore, no interruption of the recipient occurs. Rather, the agent 105 would simply display a "dialog waiting icon" and only when the recipient actually starts interacting with dialogs would the agent then notify the communication middleware 210 that dialog consumption by the recipient has begun. The timing of dialog presence status changes at the communication middleware 210 would be adjusted correspondingly, thus enabling a more accurate determination of when either an initiator or recipient is actually looking at a SMIL dialog.

Figure 8:
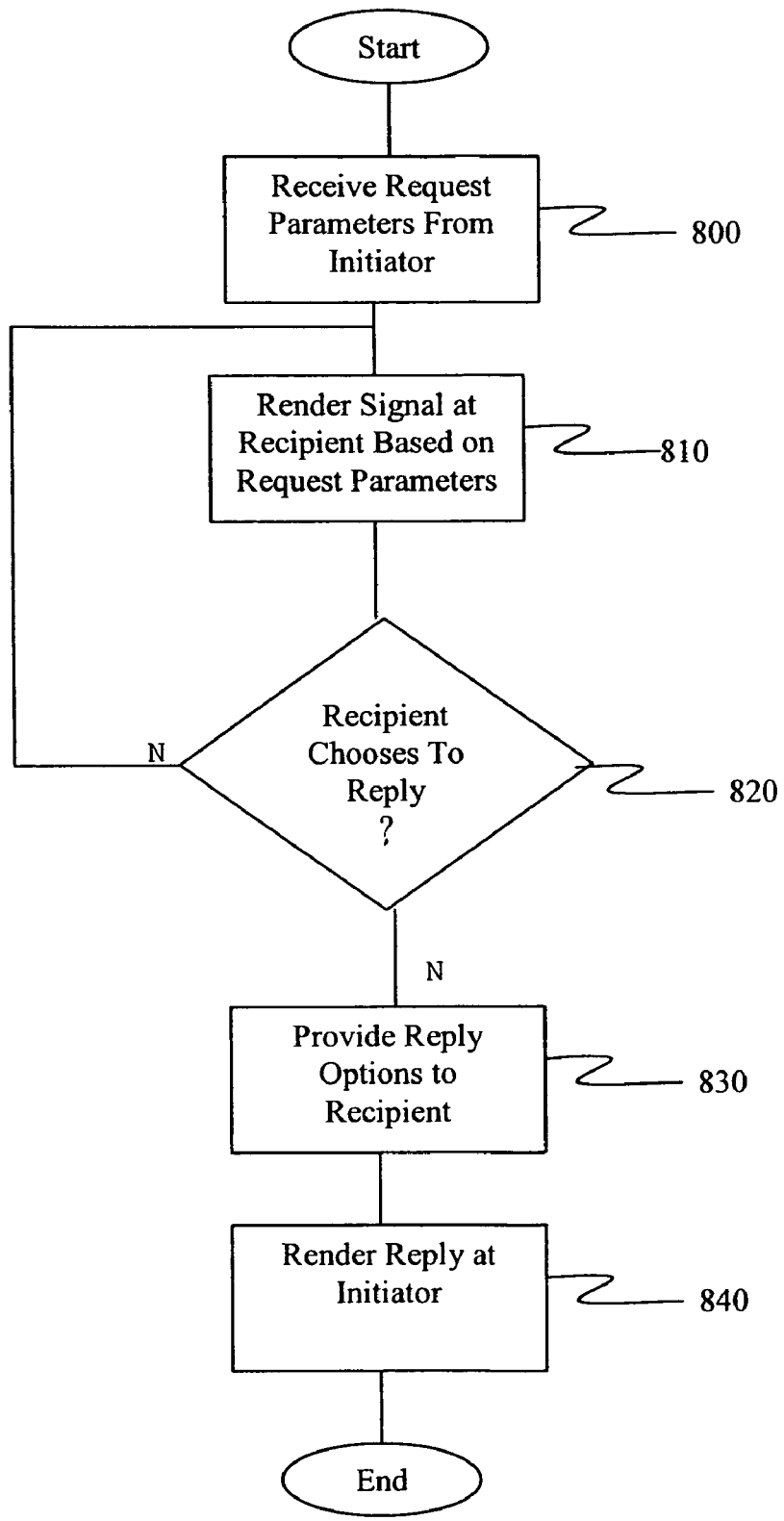
FIG. 8 is an exemplary flow chart illustrating steps of the method of the invention.

FIG. 8 is an exemplary flow chart illustrating the steps of the method of the invention. An agent of the initiator receives request parameters from the initiator and sends them to an agent of a recipient to initiate a request to communicate, as indicated in step 800. When the recipient receives the request, the agent of the recipient renders an acoustic, visual and/or tactile signal that is modulated according to the input parameters provided by the initiator, as indicated in step 810. As a result, the arrival of request information is concisely conveyed to the recipient. At the same time, the agent of the recipient renders a document, including the subject line, which lists the communication setup parameters of the initiator. As a result, the recipient is permitted to choose one of several default replies to the request from the initiator or a list of customized replies that the initiator sent along with the request. Examples of possible replies are "accept", "reject", "delay", "delay until time x", "never", "delay until event y", "try before time x" or "try before event y". Here, the recipient may choose to instantly accept the communication setup request, in which case the agent of the recipient, either itself or through mediation of an external communication system, would set up the communication session. However, the recipient may choose a different reply from the list of available replies or may even choose to not reply.

Next, a check is performed to determine whether the recipient of the request for communication wishes to reply to the request, as indicated in step 820. If the recipient chooses to reply, then the agent of the recipient sends the recipient's reply to the agent of the initiator, as indicated in step 830. The agent of the initiator then renders the recipient's reply, as indicated in step 840. Here, the agent of the initiator can render the reply as an acoustic/visual/tactile signal that concisely conveys the recipient's reply to the initiator. The agent of the recipient agent can also be set to automatically respond to the initiator without requiring input from the recipient. For example, the recipient can configure his agent to "reject" or "delay until time x" all incoming requests until further notice. If the recipient chooses not to reply, then a return to step 810 occurs where the initiation process is continued.

In the above-disclosed embodiments, the agents 105, 125 for the initiator 100 and the recipient 120 render replies and requests, respectively. In alternative embodiments, however, these agents could also be proxies that forward requests and replies to other agents that are dedicated to specific types of requests and replies. For example, the recipient could have different types of rendering devices for different types of requests. In addition, a request for a social chat could be routed to an MP3 player that plays a "friendly and soothing" melody, whereas a request for urgent communication could be routed to a program that causes the recipient's computer monitor to flash multiple times or a audio file could be played on the MP3 player that states, "This is an urgent matter", for example.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for permitting an initiator of a request for a communication session and a recipient of the request for communication to negotiate a beginning of the communication session, comprising the steps of:
    sending a request to communicate from an agent of the initiator, said request including request parameters;
    receiving the request parameters at an agent of the recipient;
    sending the request parameters from the agent of the recipient to the recipient to initiate the request to communicate with the initiator based on the request parameters;
    determining whether the recipient of the request to communicate wishes to reply to the request;
    sending a reply from the agent of the recipient to the agent of the initiator if the recipient chooses to reply;
    rendering the reply of the recipient at the agent of the initiator
    associating a dialog with a session ID of a target Web browser session in a communication application;
    detecting a non-empty list of pending SMIL dialogs in communication middleware for an active session in a machine agent;
    receiving a list of pending SMIL dialogs from the communication middleware at the machine agent for a specific user for the active Web browser session;
    rendering a SMIL dialog via the communication agent in accordance with a predetermined extension;
    sending the SMIL dialog from the machine agent to the communication agent of the active Web session;
    rendering the SMIL dialog as an HTML document at the communication agent; and
    changing a presence status of the SMIL dialog to completed.

2. The method of claim 1, further comprising the step of:
    returning to said step of sending a request to communicate if the recipient of the agent chooses not to reply.

3. The method of claim 1, wherein said reply is rendered as an acoustic/visual/tactile signal to convey reply of the recipient to the initiator.

4. The method of claim 1, further comprising the step of:
    increasing a prompt level if the agent of the recipient is unable to ascertain an availability of the recipient to receive the request for the communication session.

5. The method of claim 4, wherein said increasing step comprises mapping the context of the requested communications session to one of audible, visible, tactile and textual signals to permit an interpretation of one of an urgency, importance and type of session.

6. The method of claim 5, wherein said audible signal comprises a ring-tone having an amplitude, frequency and duration that are derived from a session context.

7. The method of claim 1, wherein said reply comprises one of accept, reject, delay, delay until time x, never, delay until event y, try before time x and try before event y.

8. The method of claim 7, wherein when the recipient accepts the communication request, the agent of the recipient sets up the communication session.

9. The method of claim 1, wherein said detecting step comprises:
    performing a call in the machine agent to retrieve an appropriate Web session (WS) method stored in the communication middleware; and
    using an ID of the active WS as a parameter for the WS method stored in the communication middleware.

10. The method of claim 1, wherein the machine agent delivers the SMIL dialogs to the communication agent.

11. The method of claim 10, wherein the SMIL dialogs are delivered to the communication agent one dialog at a time.

12. A system for permitting an initiator of a request for a communication session and a recipient of the request for the communication session to negotiate a beginning of the communication session, comprising:
- an initiator agent;
- a recipient agent, said initiator and recipient agents being in communication over a communication network;
- said initiator and recipient agents comprising:
- a communication agent having browser user interface (UI) components and
- Asynchronous Java and XML (AJAX) components; and
- a machine agent which sends SMIL dialogs to the communication agent
- a communication application for categorizing types of presence and activity data, and determining a present availability and interruptability of a recipient based on detailed presence and activity information; and
- communication middleware for receiving presence and activity information from the communication agent;
- wherein an SMIL dialog is associated with a session ID of a target Web browser session in the communication application, a non-empty list of pending SMIL dialogs is detected in the communication middleware for an active session in the machine agent, a list of pending SMIL dialogs is received at the machine agent for a specific user for an active Web browser session from the communication middleware, the SMIL dialog is rendered via the communication agent in accordance with a predetermined extension, the SMIL dialog is sent from the machine agent to the communication agent of the active Web session; the SMIL dialog is rendered as an HTML document at the communication agent; and a presence status of the SMIL dialog is changed to completed.

13. The system of claim 12, wherein a call is performed in the machine agent to retrieve an appropriate Web session (WS) method stored in the communication middleware; and an ID of the active WS is used as a parameter for the WS method stored in the communication middleware.

14. The system of claim 12, wherein the SMIL dialogs are delivered one dialog at a time to the communication agent.

15. The method of claim 1, wherein the request to communicate is sent separate from communications for the communication session, and wherein the request to communicate is sent and the reply of the recipient at the agent of the initiator is rendered before the communication session is established.

16. The method of claim 1, wherein the request parameters include a purpose of the communication session, an importance of the communication session and a time for the communication session.

17. The system of claim 12, wherein the machine agent resides outside of the communication agent.

* * * * *